Figure 1:
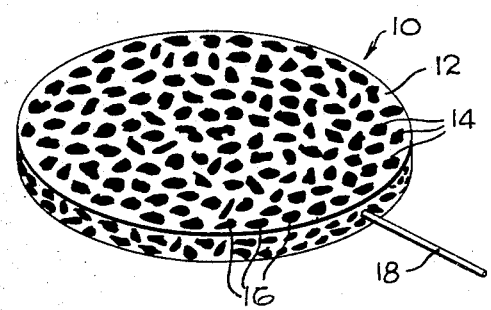

INVENTOR.
FRANK C. ARRANCE

United States Patent Office

3,287,164
Patented Nov. 22, 1966

3,287,164
ELECTRODE AND BATTERY
Frank C. Arrance, Costa Mesa, Calif., assignor to Douglas Aircraft Company, Inc., Santa Monica, Calif., a corporation of Delaware
Filed Jan. 27, 1965, Ser. No. 428,299
10 Claims. (Cl. 136—9)

This invention relates to batteries, particularly high energy density batteries, and is especially concerned with the provision of improved electrode structures for use in such batteries, and to improved battery construction embodying such electrode structures and having enhanced capacity.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead storage batteries.

Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like.

In high energy density batteries such as silver-zinc, nickel-cadmium, silver-cadmium, the electrodes are placed adjacent opposite sides of a membrane or separator which performs the function of retaining electrolyte, e.g., potassium hydroxide, separating the electrodes, and preventing migration of electrode ions which short circuit the battery.

Such separators can be constructed of either inorganic or organic materials, the preferred separators usually being inorganic separators. The electrodes are also generally in contact with an electrode screen, e.g., a nickel screen, to which the terminal wires are connected.

One object of the invention is to provide improved electrode structures, particularly having increased capacity, especially when incorporated in high energy density batteries.

Another object is to provide a novel electrode structure which when incorporated in a high energy density battery improves the efficiency of the battery in terms of power output per unit weight or volume of the battery.

It is known that the physical integrity of zinc or other electrodes used in high energy density batteries is difficult to maintain at room temperature and is particularly difficult to maintain at temperatures of the order of 100° C. and above. Thus, for example, even when the zinc electrode is placed directly in contact with the separator, slumping and segregation of the electrode material towards the bottom of the electrode compartment occurs, making it difficult to maintain good uniform contact between the electrode and the separator and also between the electrode and the electrode screen, and causing changes in electrode characteristics.

It is accordingly another object of this invention to provide improved electrode structures having improved physical strength and integrity, and to provide improved high energy density batteries incorporating improved electrode structures as noted above, and having extended periods of life and which are capable of operation at high efficiency at either ambient or elevated temperatures of the order of about 100° C. and above.

A further object of the invention is the design of a battery having a novel improved electrode structure, and which is particularly suited for air-borne applications, of small weight capable of being charged and discharged over a large number of cycles, and capable of operating efficiently at ambient temperatures and particularly at elevated temperatures, such batteries having increased capacity, high discharge voltage and good cycle life.

A still further object is the provision of improved zinc and silver electrodes of high capacity, particularly designed for use in high energy density silver-zinc cells.

Other objects and advantages will appear hereinafter.

The above objects of the invention are achieved and improved electrodes particularly designed for use in high energy density batteries are provided, by impregnating a porous conductive metal matrix, such as a nickel matrix, with the active electrode material, e.g., a zinc-zinc oxide paste. The conductive metal matrix is formed of an interconnected honeycomb of cells, the electrode material being held securely within the pores of the honeycomb. The porous metal matrix in which the active electrode material is incorporated, usually although not necessarily, constitutes a minor proportion of the total weight of the electrode.

The concept of the invention directed to a porous metal matrix whose pores are filled with active electrode materials results in battery electrodes of increased capacity particularly when incorporated in high energy density systems such as silver-zinc, silver-cadmium, nickel-cadmium, and the like. The invention concept involving the use of a metal matrix makes it possible to utilize a greater proportion of the electrode, since the conducting matrix allows electrochemical activity to occur throughout the electrode rather than just at or near the surface of the electrode. Thus, for example, a silver-zinc battery in which the electrodes are formed of a nickel metal matrix whose pores are impregnated with the active silver and zinc electrode materials respectively, has a capacity of about 3 to about 5 times the capacity of the same silver-zinc battery having the usual or standard silver and zinc electrodes, at room temperature.

Still further improved results with respect to the increased capacity and enhanced strength characteristics of the electrode structures according to the invention are obtained by sintering such electrode structures, e.g., at temperatures of the order of about 300 to about 800° C., e.g., sintering a silver electrode incorporated in a nickel matrix according to the invention at about 300° C.

Improved results are obtained according to the invention when either one or both of the electrodes of the high energy density battery are provided with the conductive metal matrix according to the invention. Best results are obtained however when both of the electrodes, e.g., both the silver and the zinc electrodes in a silver-zinc battery are provided with a metal matrix, e.g., a nickel matrix according to the invention.

Any suitable conductive metal which can be provided with a highly porous cellular honeycomb structure as noted above and which also has sufficient physical strength can be employed as the matrix for the active electrode material according to the invention. Such a metal matrix can be formed readily by the process described in my copending application Serial No. 428,381, filed of even date herewith. Nickel has been found to be particularly suitable matrix material especially for both the silver and zinc electrodes in a silver-zinc high energy density battery. However, other matrix materials or conductive metals which can be used are, for example, silver, copper, stainless steel and nickel alloys, e.g., nickel-chromium alloys. The preferred matrix metals are nickel, silver and copper, such metals having superior electrical properties as compared to the stainless steel or nickel alloys. Nickel and silver are particularly desirable. Any of the electrodes of silver-zinc, silver-cadmium or nickel-cadmium batteries can be formed of these conductive matrix metals. Thus, for example, silver and copper are each of value for use as the matrix for one electrode, e.g., the silver electrode, or for both electrodes in silver-zinc, or silver-cadmium batteries, and copper or nickel can also be employed, for example, as a metal matrix for one or both electrodes of a nickel-cadmium battery.

As previously noted the conductive metal matrix should have sufficiently large pore size to retain therein a sufficient amount of electrode material for efficient operation, but such pore size should not be so great as to provide such a small amount of conductive metal matrix as to reduce its effectiveness in the improved electrode structure hereof, or to seriously reduce the strength of the electrode. Although the pore size of the metal matrix accordingly can vary, the pore diameters of the metal matrix, e.g., a nickel matrix, can range for example, from about 0.008 to about 0.100 inch in diameter, and the web or wall thickness of the honeycomb structure of the matrix is such that, for example, there are about 8 to about 50 such pores per lineal inch of matrix.

The active electrode material which is impregnated into or which fills the pores of the conductive metal matrix preferably is an electrode material of the type employed in high energy density silver-zinc, silver-cadmium or nickel-cadmium batteries, and hence including silver, zinc, cadmium and nickel electrode materials. It is noted that silver and nickel can be used both as matrix metals and as active electrode materials for filling the pores of the metal matrix for providing improved electrodes for high energy density batteries according to the invention.

Although the weight proportion of the conductive metal matrix, e.g., nickel matrix, can constitute a major proportion of the total weight of the electrode, e.g., up to about 80% by weight of the total active metal impregnated electrode, preferred electrode structures according to the invention contain not more than about 10% by weight of the meal matrix, e.g., about 1 to about 10% of metal matrix and from about 90 to about 99% of active electrode material in the pores of such matrix. Electrode structures whose matrix constitutes a minor weight proportion of the total electrode weight, e.g., from about 1 to about 10% by weight thereof, have substantially higher efficiency in terms of power output per unit weight or volume of battery, as compared to electrode structures having a major weight proportion of metal matrix, since in electrode structures of the latter type, the amount of active electrode material is undesirably substantially reduced.

In the improved electrode structure of the invention in which the active electrode material is retained in a conductive metal matrix, such metal matrix functions (1) as a current collector to facilitate bringing the current out to the terminal, (2) to provide structural strength for the electrode, and (3) to increase the capacity of the electrode or battery in which it is incorporated by contacting the active electrode material throughout the mass of the electrode.

In fabricating an electrode structure according to the invention, such electrodes can be fabricated, for example, by preparing a paste of the active electrode material, e.g., zinc-zinc oxide and filling or impregnating the pores of the matrix with the paste by vibrating the paste into the matrix. If desired and according to a preferred embodiment as noted above, the resulting electrode structure can be sintered at elevated temperature. The resulting matrix-active electrode material structures can then be assembled into a battery by placing the electrodes, e.g., a silver electrode and a zinc electrode, on opposite sides of a porous separator for producing a high energy density silver-zinc battery.

Figure 2:
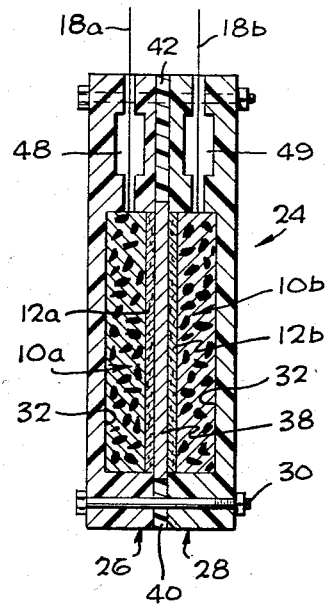

The principles of the invention are described further below in connection with the accompanying drawing wherein:

FIG. 1 illustrates an improved electrode structure in perspective according to the invention, and FIG. 2 shows a battery assembled with electrode structures according to the invention.

As illustrated in FIG. 1, the improved electrode structure indicated at 10, comprises a metal, e.g., nickel matrix 12 of substantial porosity and in the form of an interconnected honeycomb providing a multiplicity of cells or pores 14, as described above. Such cells or pores 14 are filled or impregnated with active electrode materials, such as a silver-silver oxide or zinc-zinc oxide paste, as indicated at 16.

A terminal or connecting wire 18, e.g., a nickel wire, is attached to the electrode 10.

Thus, for example, electrodes of the type indicated at 10 in FIG. 1 can be assembled to form a battery as shown in FIG. 2, employing a plastic case 24 formed of two symmetrical, e.g., Teflon, half portions 26 and 28 which are bolted together as indicated at 30. Compartments 26 and 28 of the case have recesses 32 formed therein to receive electrodes having a structure as illustrated at 10 in FIG. 1, e.g., in the form of zinc and silver electrodes 10a and 10b, respectively. The assembly of zinc electrode 10a, and preferably but not necessarily having an inorganic fibrous thin mat of potassium titanate paper 12a in contact with the inner face of the electrode, is placed in the electrode compartment 26. The silver electrode 10b is placed in the opposite electrode compartment 28 and a sheet of inorganic fiber paper or mat 12b, e.g., potassium titanate paper, is preferably but not necessarily, placed in contact with the inside surface of the electrode 10b. A separator 38, which can be either an organic separator or an inorganic separator as described in the copending application Serial No. 379,093 of Carl Berger et al., filed June 30, 1964, or in the copending application Serial No. 378,858, of Carl Berger et al., filed June 29, 1964, preferably an inorganic separator as described in said copending applications, is disposed centrally between the case portion 26 and 28 so that the electrodes 10a and 10b are pressed against opposite surfaces of such separator, with the inorganic fiber papers 12a and 12b positioned between the separator 38 and the electrodes 10a and 10b respectively.

Teflon spacers 40 and 42 are provided about the periphery of separator 38, to form a leak proof seal. Terminal wires 18a and 18b are brought through the plastic electrode sections at the top of the assembly as shown. Small electrolyte reservoirs 48 and 49 are provided in the upper portion of the respective electrode compartments 26 and 28.

The inorganic fibrous papers or mats, e.g., the potassium titanate papers 12a and 12b described above and shown in FIG. 2, employed in combination with the electrodes 10a and 10b of the invention are described in the copending application Serial No. 378,859 of Carl Berger et al., filed June 29, 1964. However, if desired, such inorganic fibrous mats 12a and 12b can be omitted, or only one of the electrodes in the embodiment of FIG. 2, e.g., the zinc electrode 10a, can be employed in combination with the potassium titanate paper 12a, thereby omitting the potassium titanate paper 12b adjacent the silver electrode 10b.

Further, according to the above copending application Serial No. 378,859 examples of other suitable fibrous inorganic materials which can be employed at 12a and 12b include, in addition to titanates, e.g., potassium titanate, aluminosilicates, silica, zirconia, and alumina.

In assembling high energy density batteries according to the invention and as illustrated in FIG. 2, the electrode structures of the invention are preferably employed in combination with inorganic separators in the form of insoluble hydrous metal oxides, e.g., hydrous zirconium oxide, of the types described in the above copending application, Serial No. 379,093 of Carl Berger et al., or in the form of the sintered ceramics, e.g., the sintered aluminosilicates, of the types described in the above copending application, Serial No. 378,858 of Carl Berger et al.

Organic separators which can be employed to produce batteries incorporating the electrode principles hereof include for example, microporous plastics such as nylon, Dynel, Teflon, sausage casing (felted regenerated cellulose), and the like.

If desired, however, other types of inorganic or organic separators can be employed.

As previously noted, the separator functions to retain electrolyte, to separate the electrodes, and also to permit transfer of electrolyte ions but prevent transfer of electrode ions.

*Example 1*

Silver and zinc electrodes are prepared in each case employing a porous nickel matrix having a pore diameter of about 0.030 inch and about 25 pores per lineal inch. A zinc paste is prepared by mixing zinc, zinc oxide and about 1% polyvinyl alcohol as a slurry with 30% KOH and filling the pores of the nickel matrix with this paste by vibrating the paste into the matrix, and forming a zinc electrode according to the invention. A silver paste is provided by mixing silver, silver oxide powder and aqueous KOH, and filling the pores of the nickel matrix with this paste by vibration of the paste into the matrix, and providing a silver electrode. A terminal wire, e.g., a silver wire, is connected to each of the zinc and silver electrodes by welding or soldering.

A thin mat of potassium titanate paper is placed over the top surface of each of the paste-nickel matrix zinc and silver electrodes and such electrode assemblies are assembled in a battery or cell as described in FIG. 2, above, so that the potassium titanate papers lie between the respective electrodes and the separator. The battery is then assembled employing 25% to 30% KOH as the electrolyte and an inorganic separator formed of a sintered ceramic aluminosilicate.

After first charging this cell at a rate of 50 milliamps per square centimeter ($ma./cm.^2$) for a total of 2.75 ampere hours (A.H.) the cell is discharged at a 50 $ma./cm.^2$ rate. Its capacity on its first discharge is 1.675 A.H. which is about 3 times as great as the capacity for standard silver-zinc cells of this type but using conventional zinc and silver electrodes, that is, without using the metal matrix for such electrodes according to the invention. Such standard or conventional cells which do not employ the metal, e.g., nickel, matrix have a capacity on first discharge of generally about 0.50 to about 0.60 A.H. It is also observed that the discharge voltage plateau for the cell of the invention described above employing silver and zinc electrodes with nickel matrix is higher than for comparable cells not employing the nickel matrix in the electrodes. Thus, the cell of the invention according to this example discharges at 1.40 to 1.41 volts whereas the same cells employing silver-zinc electrodes not utilizing the nickel matrix discharge at from about 1.35 volts.

After recharging, the test cell of this example and according to the invention is discharged at 80 $ma./cm.^2$ and its capacity at this high current density is 1.6 A.H. Comparable cells prepared without using the matrix in the electrodes have much lower capacity (0.6–0.9 A.H.) at this high rate of discharge, or may not even be capable of delivering such high currents.

The cell of this example is then cycled at 100° C. at 22.5 $ma./cm.^2$ charge and 17.5 $ma./cm.^2$ discharge on a ½ hour discharge–½ hour charge cycle for 600 cycles. Performance is good and inspection of the electrodes after such cycle testing showed them to be in excellent condition.

*Example 2*

A silver electrode is prepared in a nickel matrix as described in Example 1 above, and then resulting electrode structure is sintered at 300° C. This electrode is assembled together with a conventional paste zinc electrode not employing a nickel matrix. This cell assembled as described above and illustrated in FIG. 2 is charged at 20.0 $ma./cm.^2$. It has a capacity of 2.1 A.H. on first discharge compared to 0.5 to 0.6 A.H. for a conventional or regular cell using paste silver and zinc electrodes neither of which embodies a nickel matrix, and compared to 1.675 A.H. for the cell of the invention described in Example 1 above.

It is seen from comparing Example 1 and Example 2 that the battery of Example 2 provided with a silver electrode sintered in a nickel matrix performs in superior fashion to the cell of the invention in Example 1 wherein both the silver and zinc paste electrodes are incorporated in a nickel matrix but wherein neither of these electrodes is sintered.

*Example 3*

Silver and zinc electrodes are prepared, in each case employing a silver matrix. A silver paste is prepared from a mixture of 50% silver and 50% silver oxide using 30% KOH as the vehicle. The pores of a silver matrix having a pore diameter of about 0.08 inch and about 10 pores per lineal inch are impregnated with this paste by vibration thereof into the matrix. A zinc paste is prepared by forming a mixture of 92% zinc oxide and 8% mercuric oxide in 30% KOH as the vehicle. The pores of the same silver matrix as noted above are filled with this paste.

The above prepared paste-silver matrix, silver and zinc electrodes are assembled in a battery or call as described in FIG. 2 above, employing 25% to 40% KOH as the electrolyte and an inorganic separtor formed of hydrous zirconium oxide.

The resulting battery has substantially increased capacity both at ambient and at elevated temperatures of the order of about 100° C. as compared to the same battery employing conventional silver and zinc electrodes without utilizing a metal matrix according to the invention. Thus, at about 25° C. the capacity of the battery according to the invention including electrodes with a silver matrix as described above has a capacity of 2.45 A.H. whereas the same battery with conventional silver and zinc electrodes has a capacity of 1.5 A.H. under the same conditions.

Where the zinc and silver electrodes including tthe silver matrix, as described above are sintered, e.g., at about 500° C. following incorporation of the silver and zinc paste into the silver matrix, a battery assembled with such sintered electrodes as described above and shown in FIG. 2 exhibits still higher capacity as compared to the battery assembled with the unsintered zinc and silver electrode with silver matrix, as described above.

*Example 4*

Nickel and cadmium electrodes are prepared in each case employing a porous copper matrix having a pore diameter of about 0.050 inch and about 18 pores/lineal inch. Nickel hydroxide is first precipitated from a nickel nitrate solution with ammonium hydroxide. The nickel hydroxide precipitate is washed by decantation to remove ammonium nitrate and is then oven dried at 95° C. for 24 hours. A paste is then prepared using 80% of such nickel hydroxide and 20% graphite powder, employing 30% KOH as the vehicle. A copper matrix of the type noted above is then filled with the above nickel paste by vibrating the paste into the pores of the matrix. A paste is prepared from cadmium oxide using 30% KOH as the vehicle. A copper matrix as described above is filled with such cadmium paste by vibrating the paste into the pores of the matrix.

A battery is assembled essentially as described above and illustrated in FIG. 2, employing the paste-copper matrix, nickel and cadmium electrodes prepared above, using about 30% KOH as the electrolyte and an inorganic separator of sintered ceramic aluminosilicate. The resulting battery has a substantially higher capacity for discharge at high current density as compared to a conventional nickel-cadmium battery of the same type but employing conventional nickel and cadmium electrodes without utilizing the metal matrix principles of the invention.

*Example 5*

The paste nickel and cadmium electrodes including the copper matrix as described above, when sintered at about 350° C. prior to assembly in a battery as described above, exhibit still higher capacity as compared to the same battery described in Example 4 above, employing the unsintered paste-copper matrix nickel and cadmium electrodes.

*Example 6*

A first set of silver and zinc electrodes are each prepared employing an 18-8 (18% nickel and 8% chromium) stainless steel matrix, by the procedure described substantially in Example 1 above.

Another set of silver and zinc electrodes are each prepared employing a Chromel matrix (a nickel-chromium alloy), by the procedure described in Example 1 above.

The first and second sets of silver and zinc electrodes are each assembled in a battery as described in Example 1.

Each of these batteries so assembled has a high capacity in excess of the capacity of the same battery but employing conventional silver and zinc electrodes, without the stainless steel or nickel-chromium alloy matrix as described above, according to the invention.

From the examples above it is seen that the use of a conductive metal matrix according to the invention impregnated with an active electrode material, in a high energy density silver-zinc, silver-cadmium or nickel-cadmium battery results in increased capacity, higher discharge voltage plateaus, better capacity for discharge particularly high curent density, and at ambient and at elevated temperature, and long cycle life. Sintered electrodes of this type provide further advantages in this respect.

During discharge of the batteries described above and illustrated in the drawing, as is well known, for example, the zinc is converted to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium" and the term "metal," referring to the metals forming the respective electrodes of such battery systems, are intended to denote either the respective metals themselves or the corresponding oxides thereof.

I am aware of U.S. Patent 3,137,594 which describes a negative zinc electrode for batteries formed by distributing or scattering in random fashion throughout the electrode body ribbon-shaped fragments or turnings of a highly conductive metal such as silver or copper to contribute to the mechanical support of the zinc oxide particles. This disclosure differs materially from the improved electrodes of the invention which are in the form of a matrix or interconnected honeycomb of cells which hold the electrode material in place due to the shape of the pores. In the instant invention such matrix not only functions to provide structural strength for the electrode, but also functions as a current collector and to substantially increase the capacity by contacting and acting as a conductor for the active electrode material throughout the entire mass of the electrode.

I am also aware of the U.S. Patent 3,042,732 which describes an anode for alkaline cells prepared by mixing with the active electrode material, e.g., powdered zinc, one or more powdered materials such as copper oxide. But such added powdered materials do not form a solid matrix of porous structure which retains the active electrode material according to the invention and the electrode of the patent does not have the advantages and characteristics of the improved invention electrode.

I am also aware of U.S. Patent 2,361,378 which describes an electrode having increased capacity formed by spraying a molten metal such as aluminum or nickel upon a suitable base such as a fabric strip, and simultaneously with the spraying of the metal spraying a filler material such as a metallic oxide in finely divided form onto such base material. However, there is no teaching therein of the invention principles of an electrode formed of a solid porous conductive metal matrix retaining in the pores throughout the body of the matrix the active electrode material.

While I have described particular embodiments of my invention for purposes of illustration, it will be understood that the invention is not to be taken as limited except by the scope of the appended claims.

I claim:

1. A battery electrode structure, which comprises a porous conductive metal matrix selected from the group consisting of nickel, copper, silver, stainless steel and nickel alloys impregnated with active electrode paste material selected from the group consisting of silver, zinc, cadmium and nickel electrode materials, said porous conductive metal matrix being formed of an interconnected honeycomb of cells impregnated with said active electrode paste material, the pore diameters ranging from about 0.008 to about 0.100 inch, there being about 8 to about 50 such pores per lineal inch of matrix, said metal matrix being a minor proportion of the total weight of said electrode structure.

2. A battery electrode structure according to claim 1, wherein said electrode structure is sintered.

3. A battery electrode structure according to claim 1, which comprises about 1 to about 10% by weight of said porous conductive metal matrix.

4. A battery electrode structure according to claim 1, wherein said matrix comprises a porous conductive silver impregnated with said active electrode paste material.

5. A battery electrode structure according to claim 1, wherein said matrix comprises a porous conductive nickel impregnated with said active electrode paste material.

6. A battery electrode structure according to claim 1, wherein said matrix comprises a porous conductive copper impregnated with said active electrode paste material.

7. A battery comprising a pair of electrodes of opposite polarity and a porous separator between said electrodes for retaining electrolyte and permitting transfer of electrolyte ions, at least one of said electrodes formed of an electrode structure, which comprises a porous conductive metal matrix selected from the group consisting of nickel, copper, silver, stainless steel and nickel alloys, impregnated with active electrode paste material selected from the group consisting of silver, zinc, cadmium and nickel electrode materials, said metal matrix formed of an interconnected honeycomb of cells impregnated with said active electrode paste material, the pore diameters ranging from about 0.008 to about 0.100 inch, there being about 8 to about 50 such pores per lineal inch of matrix, said electrode material held securely within the pores of said honeycomb, said metal matrix being a minor proportion of the total weight of said electrode structure.

8. A battery comprising a pair of electrodes of opposite polarity and a porous separator between said electrodes for retaining electrolyte and permitting transfer of electrolyte ions, at least one of said electrodes being formed of an electrode structure, which comprises about 1 to about 10% by weight of a porous conductive metal matrix selected from the group consisting of nickel, copper and silver, impregnated with active electrode paste material selected from the group consisting of silver, zinc, cadmium and nickel electrode materials, said metal matrix formed of an interconnected honeycomb of cells impregnated with said active electrode paste material, the pore diameters of said matrix ranging from about 0.008 to about 0.100 inch, there being about 8 to about 50 such pores per lineal inch of matrix, said metal matrix being a minor proportion of the total weight of said electrode structure.

9. A battery comprising silver and zinc electrodes and a porous separator between said electrodes for retaining electrolyte and permitting transfer of electrolyte ions, at least one of said electrodes being formed of an electrode structure, which comprises about 1 to about 10% by weight of a porous conductive nickel matrix, impregnated with active electrode paste material, said nickel matrix formed of an interconnected honeycomb of cells impregnated with said active electrode paste material, the pore diameters of said matrix ranging from about 0.008 to about 0.100 inch, there being about 8 to about 50 such pores per lineal inch of matrix, said electrode material held securely within the pores of said honeycomb.

10. A battery comprising silver and zinc electrodes and a porous separator between said electrodes for retaining electrolyte and permitting transfer of electrolyte ions, at least one of said electrodes being formed of an electrode structure, which comprises about 1 to about 10% by weight of a porous conductive silver matrix, impregnated with active electrode paste material, said nickel matrix formed of an interconnected honeycomb of cells impregnated with said active electrode paste material, the pore diameters of said matrix ranging from about 0.008 to about 0.100 inch, there being about 8 to about 50 such pores per lineal inch of matrix, said electrode material held securely within the pores of said honeycomb.

References Cited by the Examiner
UNITED STATES PATENTS

| | | | |
|---|---|---|---|
| 2,700,062 | 1/1955 | Schlecht et al. | 136—29 |
| 2,738,375 | 3/1956 | Schlotter | 136—30 |
| 2,915,576 | 12/1959 | Strauss | 136—24 |
| 2,969,413 | 1/1961 | Peters | 136—29 |
| 3,041,388 | 6/1962 | Fukuda | 136—29 |
| 3,053,925 | 9/1962 | Donohue | 136—28 |
| 3,108,908 | 10/1963 | Krebs | 136—28 |
| 3,184,339 | 5/1965 | Ellis | 136—29 |

WINSTON A. DOUGLAS, *Primary Examiner.*

ALLEN B. CURTIS, *Examiner.*

A. SKAPARS, *Assistant Examiner.*